United States Patent
Ishida

(10) Patent No.: US 9,742,981 B2
(45) Date of Patent: Aug. 22, 2017

(54) IMAGE PROCESSING APPARATUS, IMAGE PROCESSING METHOD AND PROGRAM, AND IMAGE PICKUP APPARATUS FOR PROCESSING LIGHT FIELD DATA

(71) Applicant: CANON KABUSHIKI KAISHA, Tokyo (JP)

(72) Inventor: Chisato Ishida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/759,527

(22) PCT Filed: Dec. 24, 2013

(86) PCT No.: PCT/JP2013/085305
§ 371 (c)(1),
(2) Date: Jul. 7, 2015

(87) PCT Pub. No.: WO2014/109270
PCT Pub. Date: Jul. 17, 2014

(65) Prior Publication Data
US 2015/0350531 A1    Dec. 3, 2015

(30) Foreign Application Priority Data
Jan. 11, 2013 (JP) ................................. 2013-003570

(51) Int. Cl.
*H04N 5/232* (2006.01)
*G06K 9/00* (2006.01)

(52) U.S. Cl.
CPC ..... *H04N 5/23212* (2013.01); *G06K 9/00255* (2013.01); *H04N 5/23219* (2013.01); *H04N 2201/0084* (2013.01)

(58) Field of Classification Search
CPC ......... H04N 5/23212; H04N 5/213219; H04N 2201/0084; H04N 5/23219;
(Continued)

(56) References Cited

U.S. PATENT DOCUMENTS

| 2008/0131019 A1* | 6/2008 | Ng ........................... G06T 5/001 382/255 |
| 2010/0056188 A1* | 3/2010 | Super ................ H04M 1/72555 455/466 |
| 2012/0249550 A1* | 10/2012 | Akeley .................. H04N 5/232 345/419 |

FOREIGN PATENT DOCUMENTS

| CN | 101883291 A | 11/2010 |
| CN | 102282590 A | 12/2011 |

(Continued)

OTHER PUBLICATIONS

International Preliminary Report on Patentability issued in corresponding application No. PCT/JP2013/085305 on Jul. 23, 2015.
International Search Report and Written Opinion issued in corresponding application No. PCT/JP2013/085305 on Apr. 10, 2014.
(Continued)

*Primary Examiner* — Dennis Hogue
(74) *Attorney, Agent, or Firm* — Carter, DeLuca, Farrell & Schmidt, LLP

(57) ABSTRACT

An image processing apparatus authenticates whether the same person as a person as a destination of transmission is photographed in light field data as an object, and when the person is photographed as the object, sets a focal distance of an object image of the person as the destination of transmission as a focal distance to be used for refocusing the light field data.

19 Claims, 8 Drawing Sheets

(58) Field of Classification Search
CPC ........... H04N 5/23229; H04N 5/23293; H04N 13/0217; H04N 13/0228; H04N 13/0232; H04N 13/0282; G06K 9/00221–9/00295; G06T 2207/10052; G06T 2200/21; G06T 5/001; G06T 5/003; G06T 5/004
See application file for complete search history.

(56) References Cited

FOREIGN PATENT DOCUMENTS

| | | |
|---|---|---|
| CN | 102656878 A | 9/2012 |
| CN | 102739945 A | 10/2012 |
| CN | 102857677 A | 1/2013 |
| JP | 2010-177860 A | 8/2010 |
| JP | 2011-22796 A | 2/2011 |

OTHER PUBLICATIONS

Ng, et al., "Light Field Photography with Hand-Held Plenoptic Camera," Stanford Tech Report CTSR, Feb. 2005, pp. 1-8.
Korean Office Action issued in Appln. No. KR 10-2015-7021178 on Apr. 12, 2016 (4 pages).
Japanese Office Action issued on Feb. 9, 2017 in connection with corresponding Japanese Patent Application No. 2013-003570 together with English translation, 6 pages.
Russian Office Action issued in connection with Application No. RU2015133556 on Sep. 22, 2016, 6 pages.
Notice of Allowance issued by the Korean Patent Office on Sep. 20, 2016, in corresponding Korean Patent Application No. 10-2015-7021178 with English translation, 3 pages.
Chinese Office Action dated Jul. 4, 2017, in corresponding Chinese Patent Application No. 201380069995.0 together with English translation, 20 pages.

* cited by examiner

IMAGE PROCESSING APPARATUS, IMAGE PROCESSING METHOD AND PROGRAM, AND IMAGE PICKUP APPARATUS FOR PROCESSING LIGHT FIELD DATA

CROSS REFERENCE TO RELATED APPLICATIONS

This application is a U.S. National Stage Patent Application of International Application No. PCT/JP2013/085305, filed Dec. 24, 2013, which claims priority from Japanese Patent Application No. 2013-003570 filed Jan. 11, 2013, the disclosures of each of which are hereby incorporated by reference herein in their entirety.

TECHNICAL FIELD

The present invention relates to an image processing apparatus for processing light field data.

BACKGROUND ART

There has been known a method of generating an image having an arbitrary focal distance, depth of field, and viewpoint based on images obtained by photographing an object from many viewpoints.

For example, in NPL 1, there is disclosed such a configuration that a microlens array having microlenses that are arrayed at a rate of one for a plurality of pixels is arranged in front of an image pickup element so as to obtain not only two-dimensional distribution of light intensity but also information on an incident direction of light rays entering the image pickup element to thereby obtain three-dimensional information on an object space.

Such an image pickup apparatus as described above that is capable of obtaining the three-dimensional information on the object space is called "light field camera."

In addition, the three-dimensional information on the object space is called "light field data," and image processing of what is called "refocusing" can be performed by obtaining the light field data and performing thereon the image re-formation process after photographing. The refocusing includes, for example, changing of a focusing position of an image and a photographing viewpoint thereof and adjustment of the depth of field of the image.

When such light field data as described above that enables the refocusing is to be viewed, it is difficult in some cases to determine at which focal position an image to be displayed first is to be refocused. In order to solve this problem, in the technology of PTL 1, an object is extracted from the image to display a refocus image which is in focus at a position where the object is positioned.

CITATION LIST

Patent Literature

PTL 1: Japanese Patent Application Laid-Open No. 2011-22796

Non Patent Literature

NPL 1: Ren. Ng, and 7 others, "Light Field Photography with Hand-Held Plenoptic Camera," Stanford Tech Report CTSR, 2005-02

SUMMARY OF INVENTION

Technical Problems

As described above, in the light field camera, it is possible to select a desired focal distance after the photographing to re-form the image. It is therefore necessary to determine, from among a plurality of focal distances, the focal distance to be used when the light field data is displayed first by using the focal distance used at the time of photographing, information on a main object, and other such information and store the determined focal distance as a default focal distance.

However, for example, the light field data in which a plurality of persons are photographed may include an object at the focal distance that is different from that of the main object. In that case, if the focal distance of the main object is determined as the default focal distance at the time of transmitting the light field data to respective persons, the following problem arises. Specifically, in a case where a person of the object at the focal distance different from that of the main object is a person of a transmission destination, the light field data re-formed on the side of the destination of transmission is undesirably displayed first as an image in which an image of a person concerned is blurred.

Similarly, also at the time of re-forming the light field data to transmit the image to the respective persons, if the focal distance of the main object is determined as the default focal distance, there arises such a problem that an image of a person concerned to whom the image is transmitted is blurred depending on the destination of transmission.

Solution to Problem

In order to solve the above-mentioned problems, an image processing apparatus according to one embodiment of the present invention is configured to: obtain light field data, which is three-dimensional information on an object space; generate object information by detecting an object included in the object space using the obtained light field data and add the generated object information to the light field data; set a focal distance for re-forming the light field data based on photographing information of the light field data and add the set focal distance to the light field data; detect, based on information on the object corresponding to an external apparatus which is a destination target of transmission of the light field data, the object corresponding to the external apparatus from the object information; and update the focal distance set by a setting unit in accordance with a result of the detection.

Advantageous Effects of Invention

According to one embodiment of the present invention, even when the light field data of the image, in which a plurality of persons are photographed, is transmitted, it is possible to display the refocus image first at the destination of transmission in a state where the person concerned is in focus.

In addition, even in a case where the image having the re-formed light field data is transmitted, it is possible to display the image in which the person concerned is in focus at the destination of transmission.

Further features of the present invention will become apparent from the following description of exemplary embodiments with reference to the attached drawings.

DESCRIPTION OF EMBODIMENTS

Now, exemplary embodiments of the present invention are described in detail referring to the accompanying drawings.

First Example

Figure 1:
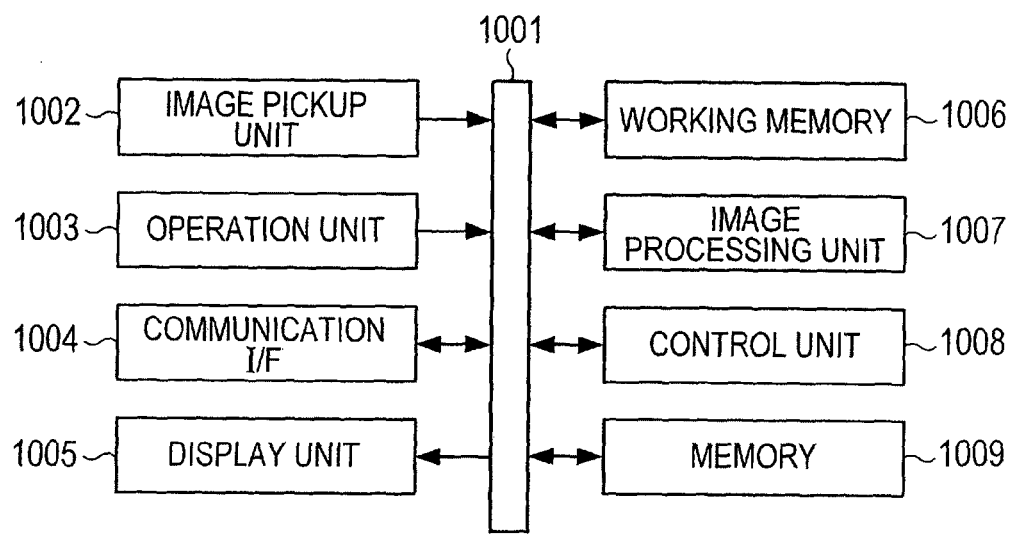
FIG. 1 is a block diagram illustrating a hardware configuration for realizing an image processing apparatus according to a first embodiment of the present invention as an image processing configuration in a light field camera.

FIG. 1 is a block diagram of an image pickup apparatus such as a digital camera for realizing an image processing apparatus according to a first embodiment of the present invention as an image processing configuration for light field data in the image pickup apparatus, for illustrating a hardware configuration of the digital camera for operations including photographing, reproduction, and transmission/reception.

Referring to FIG. 1, the digital camera includes an image pickup unit 1002 for obtaining an image pickup signal for obtaining light field data, which is three-dimensional information on an object space, and an operation unit 1003, such as buttons and a lever, to be used by a user for inputting instructions such as zooming, photographing, and selection of an image to be transmitted. The digital camera further includes a communication I/F 1004 including a terminal for wired connection such as a USB terminal and an HDMI terminal and a WiFi interface for connecting to another camera or a network, a display unit 1005, such as a liquid crystal display, for displaying a photographing target image, a menu, and others, and a working memory 1006, such as a DRAM, for storing an image and data being processed. The digital camera still further includes an image processing unit 1007 for re-forming the light field data and performing image processing such as JPEG compression and a control unit 1008, such as a CPU, for executing an instruction issued from the operation unit 1003 and a programmed control sequence. The digital camera still further includes a memory 1009 for storing various tables to be used by the control unit 1008 and image data that has been processed. Examples of the memory 1009 include a removable recording medium. The above-mentioned units and memories are electrically connected to one another via a bus 1001.

Note that, as the image pickup unit 1002, for example, there are known such a configuration as disclosed in PTL 1 that a plurality of cameras having different viewpoints as a whole are regarded as the image pickup unit 1002 and such an image pickup element as disclosed in NPL 1 that a plurality of pixels each including a plurality of sub-pixels for receiving light rays passing through different pupil partial areas of a focusing optical system are arranged. Moreover, the configuration of the image pickup unit 1002 is not directly relevant to the present invention. The description thereof is therefore omitted herein.

In the following, an operation of the digital camera illustrated in FIG. 1 is described with reference to FIGS. 2 to 5.

In the description of the first embodiment of the present invention, an image processing configuration for transmitting the light field data to an external apparatus for display is taken as an example. This embodiment discusses a case where a source of transmission is the digital camera arranged to photograph the light field data (hereinafter referred to simply as "light field camera"), which is illustrated in FIG. 1, and a destination of transmission is the light field camera having a similar configuration or a commonly-used digital camera. In this embodiment, the camera as the source of transmission discriminates whether the camera as the destination of transmission is capable of re-forming the light field data, to determine whether the light field data is to be transmitted or the light field data is to be re-formed in the source of transmission to transmit the re-formed data as a JPEG image.

Figure 2:
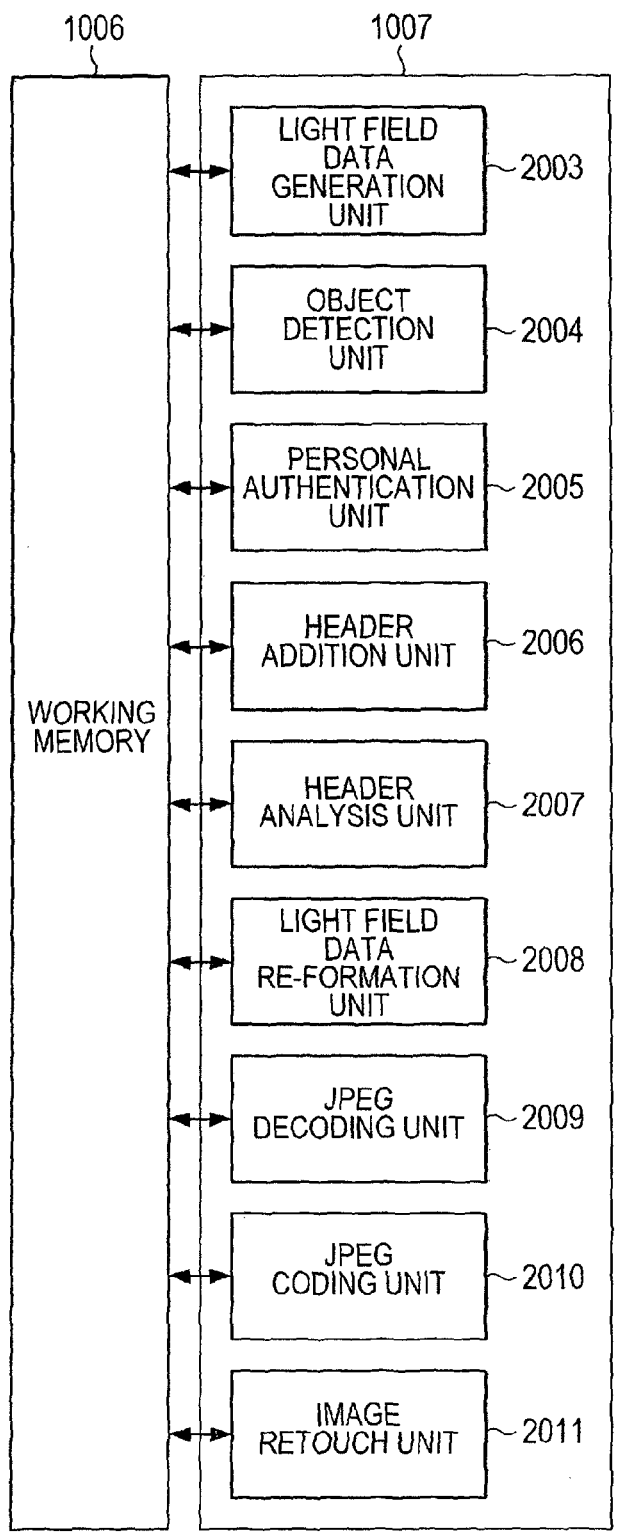
FIG. 2 is a block diagram illustrating an image processing unit of the light field camera of FIG. 1.

FIG. 2 is a block diagram illustrating a detailed configuration of the image processing unit 1007 of the light field camera illustrated in FIG. 1. Note that, in FIG. 2, the components illustrated in FIG. 1 are denoted by the same reference numerals as those of FIG. 1.

Referring to FIG. 2, a light field data generation unit 2003 converts analog data, which is photographed by the image pickup unit 1002, into the light field data. An object detection unit 2004 performs face detection using a pan-focus image and generates a face list storing, for each face, the focal distance of the face and an image of the face. A personal authentication unit 2005 uses personal authentication data corresponding to the destination of transmission to sequentially perform personal authentication on faces on the face list, to authenticate whether the face on the face list is a face of the same person of the person as the other party of transmission. In the following description of this embodiment, face information is taken as an example of object information to be detected and information to be used for authentication. However, the object detection is not limited to the face detection, and for example, another object or an animal may be used as long as the object can be detected and discriminated with use of a specific shape and feature.

Further, a header addition unit 2006 adds the generated face list to a header of the light field data, and a header analysis unit 2007 analyzes the header of the light field data to read out the face list. A light field data re-formation unit 2008 re-forms the light field data using the default focal distance. A JPEG coding unit 2010 codes the re-formed image by JPEG compression and a JPEG decoding unit 2009 expands the compressed image to decode the image. An image retouch unit 2011 performs an image retouch process such as changing the size of the image to the size for display.

The above-mentioned operations of the respective units of the image processing unit 1007 are controlled by the control unit 1008.

Figure 3:
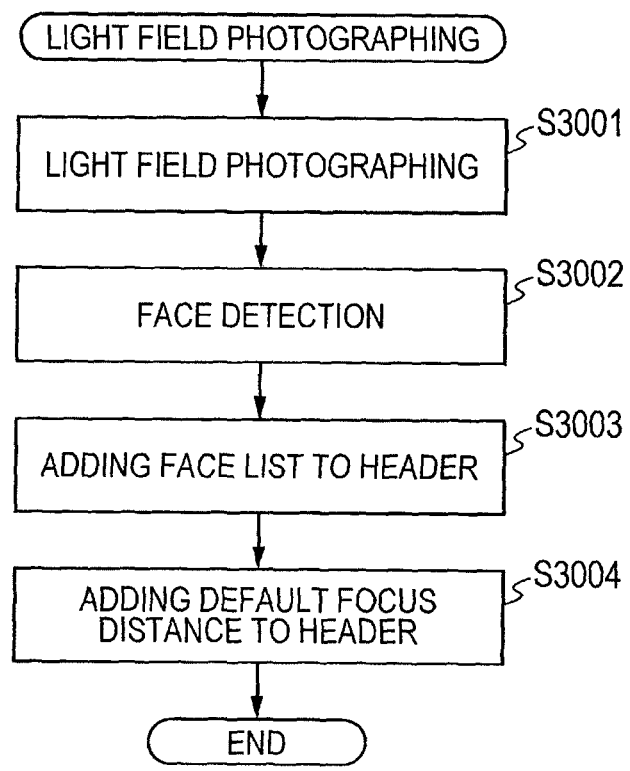
FIG. 3 is a flow chart illustrating a photographing operation of the light field camera of FIG. 1.

Next, a photographing operation performed by the light field camera of FIG. 1 is described with reference to a flow chart of FIG. 3. This operation is performed by the control unit 1008 executing a programmed control sequence, and the operations of the respective units are performed in response to instructions issued from the control unit 1008.

First, in Step S3001, the light field data generation unit 2003 obtains the analog data photographed by the image pickup unit 1002 to convert the obtained analog data into the light field data.

In Step S3002, the light field data re-formation unit 2008 re-forms the light field data obtained by the conversion into the pan-focus image. Next, the object detection unit 2004 uses the pan-focus image obtained by the re-formation to perform face detection and, based on a result of the face detection, generates the face list by storing, for each face, the focal distance of each face and the image of the face.

In Step S3003, the header addition unit 2006 adds the generated face list to the header of the light field data.

In Step S3004, the header addition unit 2006 sets the focal distance at the time of photographing as the default focal distance to add the set default focal distance to the header. Each photographing information has one focal distance at the time of photographing. The default focal distance is information indicating a specific object to be in focus when the light field data is re-formed.

Figure 4:
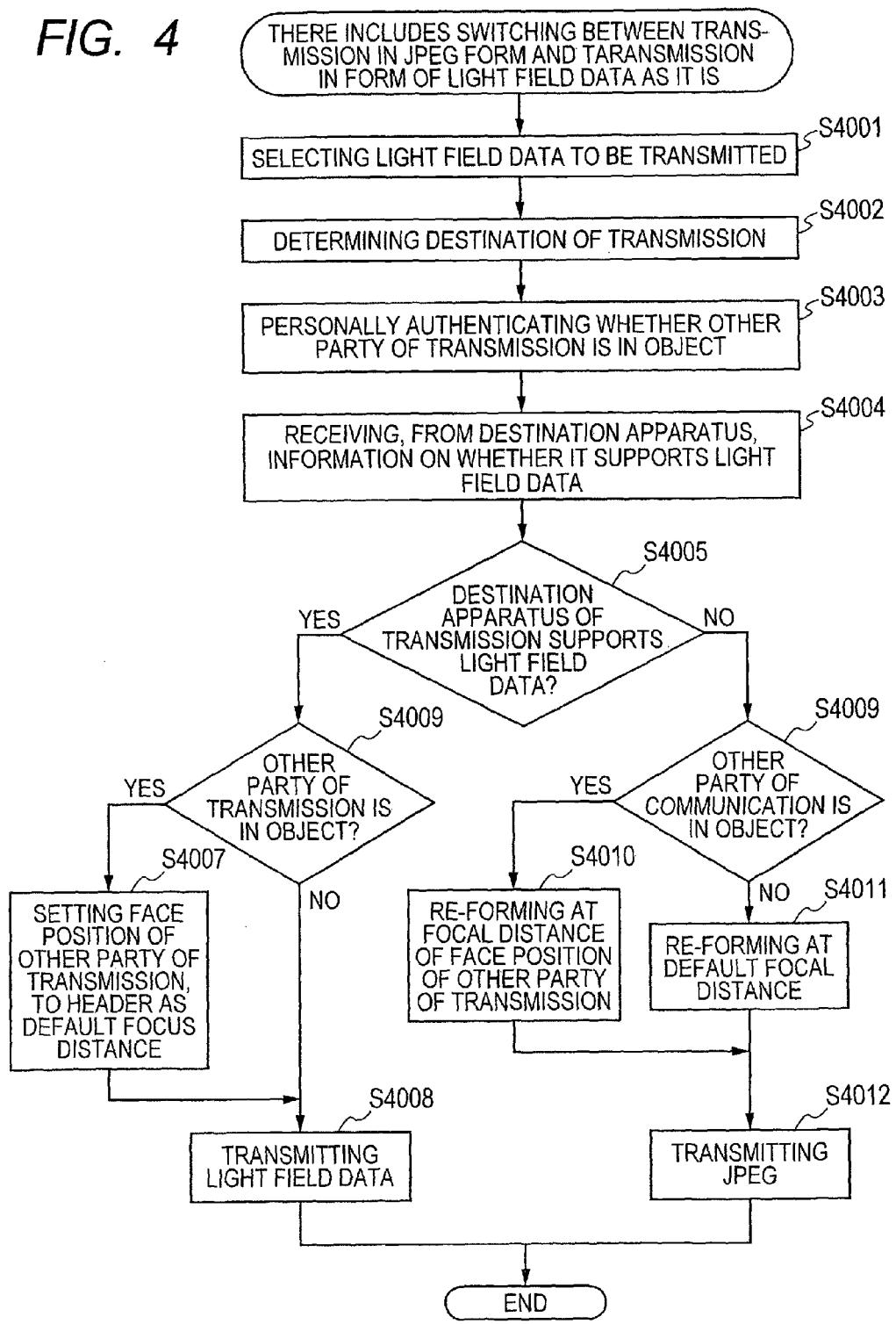
FIG. 4 is a flow chart illustrating a transmission operation of the light field camera of FIG. 1.

Next, a transmission operation performed by the light field camera of FIG. 1 is described with reference to a flow chart of FIG. 4. This operation is also performed by the control unit 1008 executing a programmed control sequence, and the operations of the respective units are performed in response to the instructions issued from the control unit 1008.

In Step S4001, in response to the user operating the operation unit 1003, the control unit 1008 designates and determines the light field data to be transmitted from a list of photographed light field data displayed on the display unit 1005.

In Step S4002, in response to the user operating the operation unit 1003, the control unit 1008 designates and determines the destination of transmission (an I/F or an external apparatus to which the light field data is to be output) to which the determined light field data is to be transmitted. In this step, based on the determined destination of transmission, the control unit 1008 obtains from the memory 1009 the personal authentication data (information on the other party of transmission or the object associated with the other party of transmission) corresponding to the destination of transmission.

In Step S4003, the header analysis unit 2007 analyzes the header of the light field data of the transmission target and reads out the face list. Next, the personal authentication unit 2005 uses the personal authentication data corresponding to the destination of transmission to sequentially perform personal authentication on the faces on the face list that is read out, to authenticate whether the face of the face list is a face of the same person of the person as the other party of transmission or the object associated with the other party of transmission. Note that, it is assumed in this embodiment that the personal authentication data is stored in the memory 1009 in association with the destination of transmission. The personal authentication data corresponding to the destination of transmission is not necessarily the other party of transmission himself/herself, and may be an object associated with the other party of transmission. For example, a family member, close friend, or pet of the other party of transmission may be used as the personal authentication data. In this case, as the personal authentication data, objects associated with the other party of transmission are grouped together to be recorded, or information on the associated object designated by the destination of transmission is received from a server or the destination of transmission to use the received information for authentication on the corresponding object.

In Step S4004, the control unit 1008 controls the communication I/F 1004 to receive and obtain, from a destination apparatus, support information for discriminating whether the destination apparatus supports the light field data. The information for discriminating whether the destination apparatus supports the light field data may be stored in advance in the memory 1009 along with a list of the destinations of transmission, and in this case, the control unit 1008 obtains the above-mentioned information based on information stored in the memory 1009. Further, it is discriminated in this embodiment whether the destination apparatus supports the light field data, but it may be discriminated whether, of the communication I/Fs 1004, an interface selected to be used for data communication supports the light field data. Still further, for example, in a case where when the user selects the communication method in view of the destination apparatus, it may be discriminated whether the selected communication method supports the light field data.

In Step S4005, in a case where when the received information indicates that the destination apparatus supports the light field data, the flow proceeds to Step S4006. When the received information indicates that the destination apparatus does not support the light field data, the flow proceeds to Step S4009.

In Step S4006, it is determined whether the personal authentication unit 2005 determines that on the face list, there is a face of the same person as the person as the other party of transmission or the object associated with the other party of transmission. If it is determined that the personal authentication unit 2005 determines that there is a face of the same person as the person as the other party of transmission or the object associated with the other party of transmission, the flow proceeds to Step S4007. If it is determined that the personal authentication unit 2005 determines that there is no face of the same person as the person as the other party of transmission or the object associated with the other party of transmission, the default focal distance that is added at the time of photographing is not updated and the flow proceeds to Step S4008.

In Step S4007, the header addition unit 2006 updates the default focal distance that has been set and added to the light field data in Step S3004 with the focal distance of the face determined as the face of the same person as the person as the other party of transmission or the object associated with the other party of transmission.

In Step S4008, the control unit 1008 instructs the communication I/F 1004 to transmit the light field data.

In Step S4009, the same determination as that of S4006 is performed. If it is determined that the personal authentication unit 2005 determines that there is a face of the same person as the person as the other party of transmission or the object associated with the other party of transmission, the flow proceeds to Step S4010. If it is determined that the personal authentication unit 2005 determines that there is no face of the same person as the person as the other party of transmission or the object associated with the other party of transmission, the flow proceeds to Step S4011.

In Step S4010, the light field data re-formation unit 2008 updates the default focal distance with the focal distance of a face on the face list that is determined as the same person, and re-forms the light field data of the transmission target at the updated focal distance.

In Step S4011, the light field data re-formation unit 2008 re-forms the light field data of the transmission target at the default focal distance.

In Step S4012, the JPEG coding unit 2010 performs JPEG compression on the re-formed image, and the control unit 1008 controls the communication I/F 1004 to transmit the JPEG image to the destination of transmission.

Figure 5:
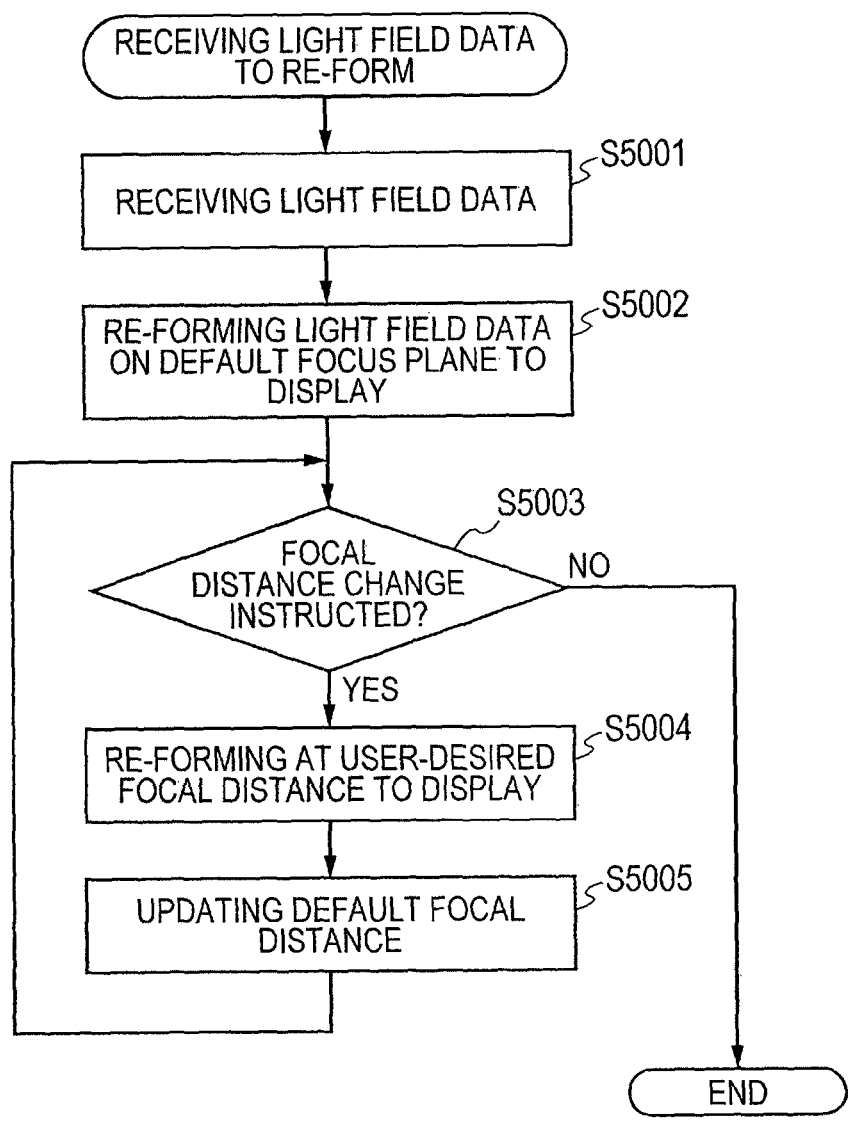
FIG. 5 is a flow chart illustrating a display operation of the light field camera of FIG. 1.

Next, an operation of receiving the light field data, of the light field camera of FIG. 1 is described with reference to a flow chart of FIG. 5. This operation is also performed by the control unit 1008 executing a programmed control sequence, and the operations of the respective units are performed in response to the instructions issued from the control unit 1008.

In Step S5001, the control unit 1008 controls the communication I/F 1004 to receive the light field data.

In Step S5002, the header analysis unit 2007 obtains the default focal distance from the header of the received light field data. Next, the light field data re-formation unit 2008 re-forms the received light field data at the default focal distance. The image retouch unit 2011 changes the size of the re-formed image to the size for display and the control unit 1008 displays the resized image on the display unit 1005.

In Step S5003, the control unit 1008 determines whether the user operates the operation unit 1003 to give an instruction to change the focal distance. When it is determined that the user gives an instruction to change the focal distance, the flow proceeds to Step S5004. Otherwise, the operation is brought to an end.

In Step S5004, the light field data re-formation unit 2008 re-forms the received light field data at the obtained focal distance. Next, the image retouch unit 2011 changes the re-formed image to the size for display. The control unit 1008 displays the resized image on the display unit 1005.

In Step S5005, the header addition unit 2006 updates the default focal distance as instructed by the user.

As described above, in this embodiment, in a case where a person who is to receive the light field data or the object associated with the person who is to receive the light field data is photographed as the object in the light field data to be transmitted, the default focal distance for re-formation is set to such a focal distance that the person who is to receive the light field data is in focus. It is accordingly possible to display, when the light field data is received and displayed first, such an image that the person who receives the light field data or the object associated with the person who receives the light field data is in focus.

Note that, it is discriminated in this embodiment whether the destination apparatus is the camera capable of re-forming the light field data, but without performing such discrimination, the JPEG image re-formed at the focal distance of the person who receives the light field data may be transmitted as well.

Further, although the light field data is re-formed at the time of photographing in order to generate the pan-focus image and the face is detected based on the generated pan-focus image in this embodiment, the pan-focus image may be obtained at the time of photographing in order to perform the face detection.

Alternatively, the focal distance of the light field data may be sequentially changed to re-form the light field data, so as to perform the face detection on each re-formed image.

In this embodiment, the description is made by taking the example in which the image processing apparatus retains the personal authentication data of the other party of transmission or the object associated with the other party of transmission. Alternatively, the control unit 1008 may obtain the personal authentication data from the other party of transmission (the external apparatus) when communication with the other party of transmission is established or when the user designates the destination of transmission.

In this embodiment, the description has been made by taking the example in which the user selects the image to be transmitted. Alternatively, when the destination of transmission is determined, the user may designate a list of images to be transmitted such as a folder so that the image including the object corresponding to the destination of transmission is automatically selected from the designated list to be transmitted. In this embodiment, the default focal distance of the light field data to be transmitted is set to the focal distance of the person who is to receive the light field data or the object associated with the person who is to receive the light field data. However, a value to be set is not limited to the default focal distance. For example, a priority order may be set for each focal distance or face so that, when the destination of transmission sets the focal distance to be used for refocusing the light field data, a higher priority order is assigned to the focal distance of the person who receives the light field data or the object associated with the person who receives the light field data.

Second Example

In a second embodiment of the present invention, a case where the light field camera and a cloud server realize the configuration of the image processing apparatus of the present invention is described. This embodiment discusses an example of an image processing configuration to be applied when the user uploads the light field data photographed by the light field camera onto the cloud server and a given user logs in to the cloud server to download the image to be displayed. In this case, the light field camera has the same configuration as that of the first embodiment, and hence a description thereof is omitted here.

Figure 6:
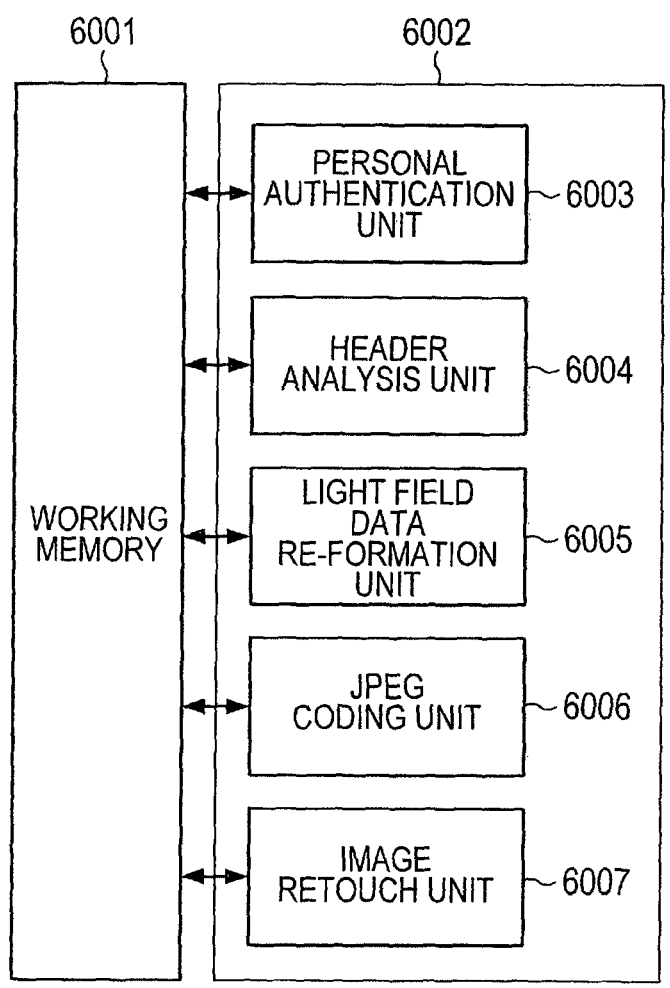
FIG. 6 is a block diagram illustrating an image processing unit of a cloud server for realizing an image processing apparatus according to a second embodiment of the present invention as an image processing configuration in the light field camera and the cloud server.

FIG. 6 is a block diagram illustrating an image processing unit 6002 of the cloud server for realizing the image processing configuration according to this embodiment.

Referring to FIG. 6, the cloud server includes a working memory 6001, such as a DRAM, for storing the image and the data being processed. The image processing unit 6002 includes a personal authentication unit 6003 for sequentially performing the personal authentication on the faces on the face list by using the personal authentication data to authenticate whether the corresponding face is the face of the same person as the logged-in user, a header analysis unit 6004 for analyzing the header of the light field data to read out the face list, a light field data re-formation unit 6005 for re-forming the light field data at the focal distance of the face on the face list that is determined as the same person as the logged-in user, a JPEG coding unit 6006 for performing JPEG compression on the re-formed image, and an image retouch unit 6007 for performing retouching such as changing the size of the image.

The above-mentioned operations of the respective units of the image processing unit 1007 are controlled by a control unit of a cloud server (not shown), such as a CPU, executing instructions issued from the operation unit and programmed control sequences.

First, an operation of uploading the light field data from the light field camera onto the cloud server is described. This operation is executed by the control unit 1008 of the light field camera executing a programmed control sequence, and the operations of the respective units are performed in response to the instructions issued from the control unit 1008.

In response to the user operating the operation unit 1003, the control unit 1008 designates and determines the light field data to be uploaded from a list of photographed light field data displayed on the display unit 1005. Next, the control unit 1008 controls the communication I/F 1004 to upload the determined light field data onto the cloud server. The header including the face list, which is generated in the first embodiment, is added to the light field data to be uploaded.

Figure 7:
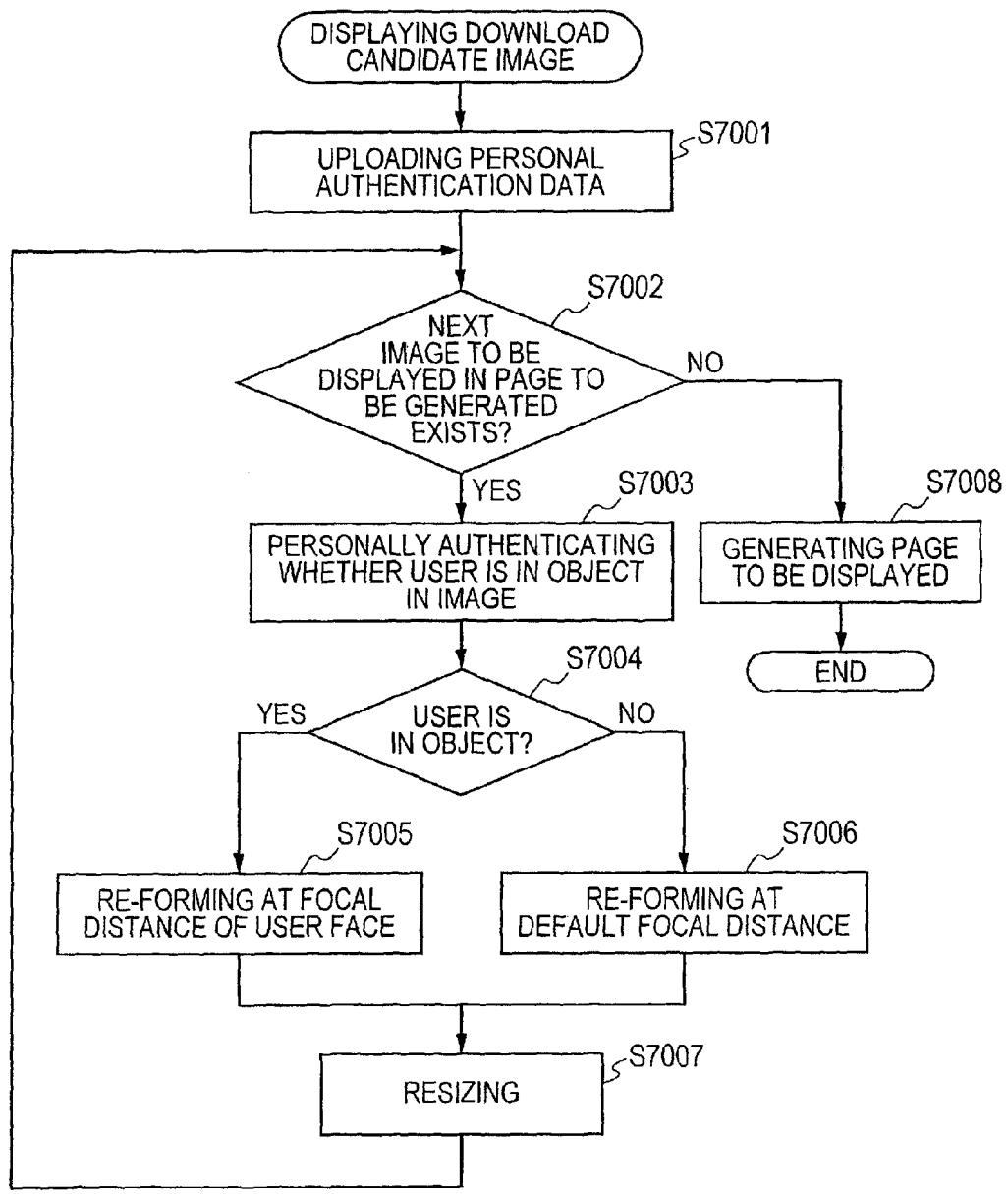
FIG. 7 is a flow chart illustrating an operation of displaying a downloading candidate image performed by the cloud server of FIG. 6.

Next, an operation of displaying the images retained in the cloud server to the user who logs in to the cloud server is described with reference to a flow chart of FIG. 7. This operation is performed by the control unit of the cloud server executing a programmed control sequence, and the operations of the respective units of the image processing unit 6002 are performed in response to the instructions issued from the control unit of the server.

In Step S7001, the cloud server requests the user to upload the personal authentication data when the user logs in to the cloud server from the user's PC. In response to this request, the personal authentication data is uploaded from the user's PC. In this embodiment, when confirming that the user logs in to the cloud server, the cloud server generates a page for displaying, with use of thumbnails, the images on the server associated with the user in a list format or sequentially. As an example of a method of selecting the image to be displayed to the user, the following method is conceivable. Specifically, the images uploaded in the past from the camera or recording medium owned by the user, the images uploaded in the past few weeks by a user who is registered as an acquaintance of the user, or other such images are selected in accordance with login information.

In Step S7002, the control unit of the cloud server determines whether there is a next image to be displayed in the page to be generated for the user who logs in. When there is such a next image, the flow proceeds to Step S7003, and otherwise, the flow proceeds to Step S7008.

In Step S7003, the header analysis unit 6004 analyzes the header of the light field data to be displayed to read out the face list. Next, the personal authentication unit 6003 uses the personal authentication data to sequentially perform personal authentication on the faces on the face list, to authenticate whether the corresponding face is the face of the same person as the logged-in user or the object associated with the logged-in user.

In Step S7004, in accordance with a result of the authentication performed in Step S7003, in a case where there is a face of the same person as the logged-in user or the object associated with the logged-in user, the flow proceeds to Step S7005, and otherwise, the flow proceeds to Step S7006. In Step S7005, the light field data re-formation unit 6005 re-forms the light field data at the focal distance of a face on the face list that is determined as the face of the same person as the logged-in user or the object associated with the logged-in user.

In Step S7006, the light field data re-formation unit 6005 re-forms the light field data at the default focal distance added to the header.

In Step S7007, the image retouch unit 6007 changes the size of the re-formed image in accordance with the page to be generated.

In Step S7008, the control unit of the cloud server generates the page by displaying the re-formed image.

Figure 8:
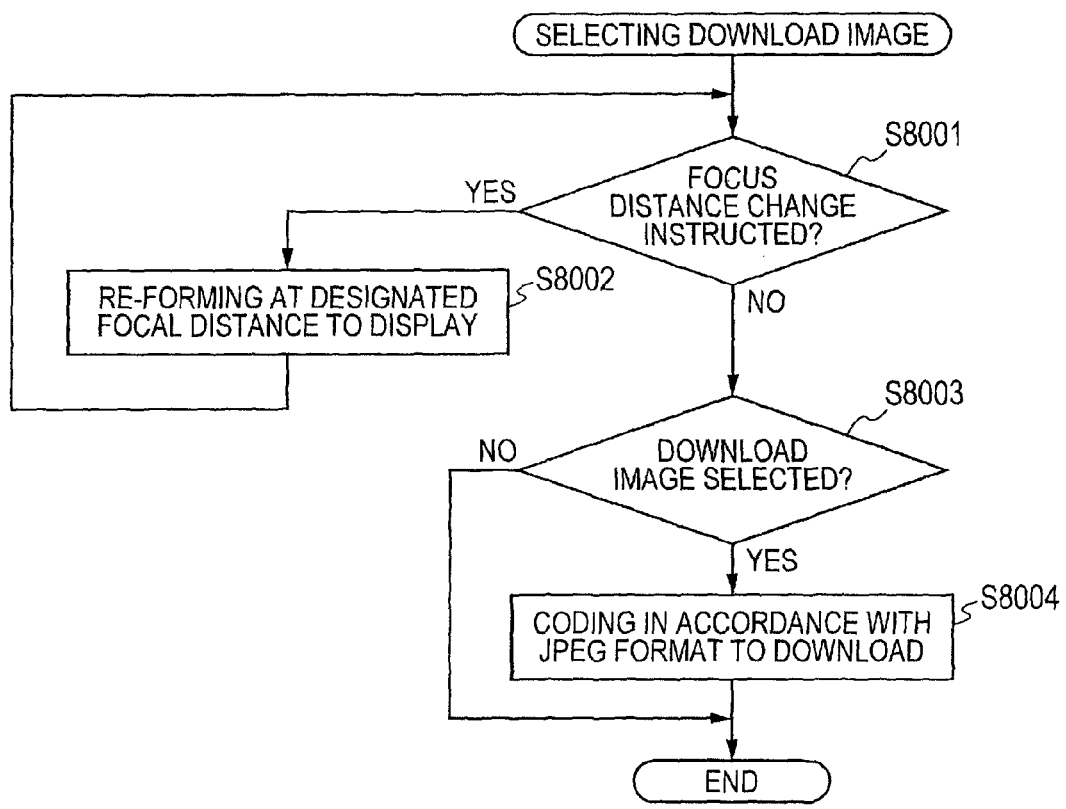
FIG. 8 is a flow chart illustrating an operation of downloading an image performed by the cloud server of FIG. 6.

Next, an operation of downloading the image from the cloud server is described with reference to a flow chart of FIG. 8. This operation is also performed by the control unit of the cloud server executing a programmed control sequence, and the operations of the respective units of the image processing unit 6002 are performed in response to the instructions issued from the control unit of the server.

In Step S8001, the control unit of the cloud server determines whether the user gives an instruction to change the focal distance. In a case where the user gives an instruction to change the focal distance, the flow proceeds to Step S8002. Otherwise, the flow proceeds to Step S8003.

In Step S8002, the light field data re-formation unit 6005 re-forms the light field data at the focal distance designated by the user. Next, the image retouch unit 6007 changes the size of the re-formed image to the size for display to update the page.

In Step S8003, the control unit of the cloud server determines whether the user gives an instruction to download the image. In a case where the user gives an instruction to download the image, the flow proceeds to Step S8004. Otherwise, the operation is brought to an end.

In Step S8004, the JPEG coding unit 6006 performs JPEG compression on the image to be downloaded, and the control unit of the cloud server downloads the compressed image.

As described above, according to this embodiment, it is possible to download the image in which the person who logs in to the cloud server is in focus.

Note that, although the light field camera as the source of transmission performs the face detection in this embodiment in the same manner as in the first embodiment, the cloud server onto which the image is uploaded may perform the face detection.

Furthermore, needless to say, the object of the present invention can be achieved even by supplying a recording medium storing a program code of software realizing the function of the above-mentioned embodiment in a system or an apparatus, and allowing a computer (or a CPU or an MPU) of the system or the apparatus to read the program code stored in the recording medium for execution.

In this case, the program code itself read from the recording medium realizes the function of the above-mentioned embodiment, and the program code itself and the recording medium storing the program code constitute the present invention.

As the recording medium for supplying a program code, for example, a flexible disk, a hard disk, an optical disk, a magnetooptical disk, a CD-ROM, a CD-R, a magnetic tape, a nonvolatile memory card, or a ROM can be used.

Furthermore, needless to say, by executing the program code read by the computer, the function of the above-mentioned embodiment can to realized, and also an OS (basic system or an operating system) operated on the computer performs partial or entire actual processing in accordance with an instruction of the program code, whereby the function of the above-mentioned embodiment can be realized by that processing.

Furthermore, needless to say, after the program code read from the recording medium is written in a memory provided in a function extension board inserted in a computer or a function extension unit connected to the computer, a CPU or the like provided in the function extension board or the function extension unit performs partial or entire actual processing in accordance with an instruction of the program code, whereby the function of the above-mentioned embodiment can be realized by that processing.

As described above, although the present invention has been described by way of preferable examples, the present invention is not limited to the above examples, and can be variously modified within the scope of claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus, comprising:
   a processor; and
   a memory storing instructions that, when executed by the processor, cause the processor to:
   obtain light field data, which is three-dimensional information within an object space;
   generate first object information by detecting an object included in the object space using the light field data;
   add the first object information to the light field data;
   set focal information for re-forming the light field data based on photographing information of the light field data;
   add the focal information to the light field data;
   receive information regarding an object which is a destination target of transmission from an external apparatus;
   detect second object information corresponding to the object from the first object information added to the light field data based on the received information regarding the object; and
   update the focal information in accordance with a result of the detection.

2. The image processing apparatus according to claim 1, wherein the instructions, when executed by the processor, further cause the processor to transmit, to the external apparatus, the light field data obtained after the focal information is updated.

3. The image processing apparatus according to claim 1, wherein the instructions, when executed by the processor, further cause the processor to:
   obtain support information for discriminating whether one or more of the external apparatus, a communication unit to be used for data communication with the external apparatus, and a communication method to be used for the data communication with the external apparatus supports the light field data, and
   wherein, in a case where it is determined based on the support information that the one or more of the external apparatus, the communication unit, and the communication method supports the light field data, the processor transmits, to the external apparatus, the light field data obtained after the focal information is updated.

4. The image processing apparatus according to claim 3, wherein the instructions, when executed by the processor, further cause the processor to:
   re-form the light field data in accordance with the updated focal information to generate a re-formed image in a case where it is determined, based on the obtained support information, that the one or more of the external apparatus, the communication unit, and the communication method do not support the light field data; and
   transmit the re-formed image to the external apparatus.

5. The image processing apparatus according to claim 4, wherein the instructions, when executed by the processor, further cause the processor to code the re-formed image.

6. The image processing apparatus according to claim 3, wherein the support information comprises information received from the external apparatus.

7. The image processing apparatus according to claim 1, wherein the processor does not update the focal information in a case where the processor does not detect the information regarding the object corresponding to the external apparatus from the first object information added to the light field data.

8. The image processing apparatus according to claim 1, wherein the instructions, when executed by the processor, further cause the processor to obtain, from information stored in the memory, the information regarding the object corresponding to the external apparatus which is the destination target of transmission of the light field data.

9. The image processing apparatus according to claim 1, wherein the instructions, when executed by the processor, further cause the processor to receive, from the external apparatus, the information regarding the object corresponding to the external apparatus which is the destination target of transmission of the light field data.

10. An image processing method, comprising:
    obtaining light field data, which is three-dimensional information within an object space;
    generating first object information by detecting an object included in the object space using the light field data and adding the first object information to the light field data;
    setting focal information for re-forming the light field data based on photographing information of the obtained light field data and adding the set focal information to the light field data;
    receiving information regarding an object which is a destination target of transmission from an external apparatus;
    detecting second object information corresponding to the object from the first object information added to the light field data based on the received information regarding the object; and
    updating the set focal information in accordance with a result of the detection.

11. A non-transitory computer-readable storage medium storing a program for controlling an image processing apparatus for processing light field data, which is three-dimensional information within an object space, the method comprising:
    obtaining the light field data;
    generating first object information by detecting an object included in the object space using the obtained light field data;
    adding the first object information to the light field data;
    setting focal information for re-forming the light field data based on photographing information of the obtained light field data;
    adding the set focal information to the light field data;
    receiving information regarding an object which is a destination target of transmission from an external apparatus;
    detecting second object information corresponding to the object from the first object information added to the light field data based on the received information regarding the object; and
    updating the set focal information in accordance with a result of the detection.

12. An image pickup apparatus, comprising:
the image processing apparatus according to claim 1, wherein the instructions, when executed by the processor, further cause the processor to:
  obtain an image pickup signal for obtaining the light field data;
  communicate with the external apparatus;
  receive an instruction; and
  transmit, based on information regarding one or more of the external apparatus selected in accordance with the received instruction, a communication means to be used for data communication with the external apparatus, and a communication method to be used for the data communication with the external apparatus, one of the light field data and a re-formed image.

13. The image pickup apparatus according to claim 12, wherein the instructions, when executed by the processor, further cause the processor to obtain the information regarding the external apparatus selected in accordance with the received instruction from the selected external apparatus.

14. The image pickup apparatus according to claim 13, wherein the instructions, when executed by the processor, further cause the processor to select the light field data obtained based on the information on the external apparatus selected in accordance with the received instruction.

15. The image pickup apparatus according to claim 12, wherein the instructions, when executed by the processor, further cause the processor to:
  input an instruction to change a focal information added to the light field data; and
  re-form the light field data based on the focal information changed in accordance with the instruction.

16. A server apparatus, comprising:
a processor; and
a memory storing instructions that, when executed by the processor, cause the processor to:
  communicate with an external apparatus;
  obtain light field data, which is three-dimensional information within an object space, and first object information of the light field data, which indicates the object included in the object space and a focal distance of the object;
  receive information regarding an object which is a destination target of transmission from an external apparatus;
  detect, based on the received information, second object information corresponding to the object from the first object information;
  determine the focal information for re-forming the light field data in accordance with a result of the detection;
  re-form the light field data based on the determined focal information to generate a re-formed image; and
  upload the re-formed image to the external apparatus in response to an instruction issued from the external apparatus.

17. The server apparatus according to claim 16, wherein the first object information is added to the light field data.

18. The server apparatus according to claim 17, wherein the instructions, when executed by the processor, further cause the processor to:
  generate the first object information by detecting the object included in the object space using the obtained light field data and adding the first object information to the light field data;
  set the focal for re-forming the light field data based on photographing information of the obtained light field data; and
  wherein the information regarding the object corresponding to the external apparatus is detected from the first object information.

19. The server apparatus according to claim 18, wherein the instructions, when executed by the processor, further cause the processor to:
  receive an instruction to change the focal from the external apparatus; and
  re-form the light field data to generate the re-formed image based on the changed focal distance.

* * * * *